(No Model.)
H. T. BUSH.
VALVE.
No. 555,759. Patented Mar. 3, 1896.
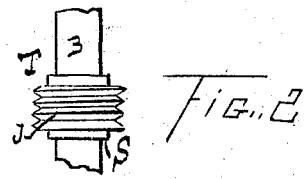
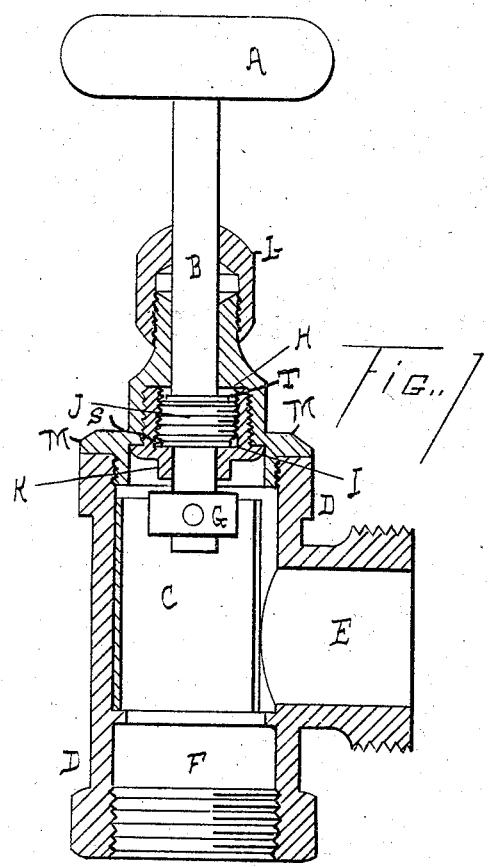

UNITED STATES PATENT OFFICE.

HIRAM T. BUSH, OF DETROIT, MICHIGAN, ASSIGNOR TO THE IDEAL MANUFACTURING COMPANY, OF SAME PLACE.

VALVE.

SPECIFICATION forming part of Letters Patent No. 555,759, dated March 3, 1896.

Application filed December 4, 1894. Serial No. 530,802. (No model.)

*To all whom it may concern:*

Be it known that I, HIRAM T. BUSH, of Detroit, in the county of Wayne and State of Michigan, have invented a new and useful Improvement in Valves, of which the following is a specification.

My invention consists in an improvement in valves, hereinafter fully described and claimed.

Figure 1 is a vertical section through the valve-casing, the stem being shown in elevation; and Fig. 2 is an enlarged elevation of a portion of the valve-stem.

My invention is shown as applied to a hot-water valve, in which D is the shell, F and E the inlet and outlet ports of the valve, and C a wing, which is turned in said casing, so as to open or close port E by a lug G, secured on the lower end of the valve-stem B. Valve-stem B is enlarged for a portion of its length, so as to form two shoulders S and T, between which it is enlarged and threaded, as shown at J, and this thread meshes with a screw-thread formed in bushing K, which screws into the upper part, M, of the valve-case. A represents a knob on the upper end of the valve-stem B, by which it may be turned, and L represents a stuffing-box.

The operation of my invention is as follows: When valve-stem B is rotated so as to close the valve, screw J raises the valve-stem, so that when the valve is wide open the shoulder T seats against the face H of the upper part of the valve-case, and when the stem is turned to close the valve screw J lowers the stem until, when the valve is fully closed, the shoulder S seats against the face I of bushing K, so that the stem forms a water or steam tight joint with the case whenever the valve is fully open or fully closed, and thus prevents any escape of water or steam, if the stuffing-box should happen to leak.

Of course the direction of screw J may be such as to reverse the motion herein stated, and screw J may be placed otherwise than between shoulders S and T.

What I claim as my invention, and desire to secure by Letters Patent, is—

In a valve, the combination with the casing D having an inlet and outlet port, of the interiorly-threaded bushing K screwed into the upper part of the valve-casing, seats H and I formed respectively on the valve-casing and the bushing K, a reciprocating valve-stem B, provided with shoulders S and T adapted to seat against said seats H and I, an enlarged screw-threaded boss T intermediate said shoulders and engaging said threaded bushing, and a valve carried by said stem, all constructed and arranged in such manner that said shoulders seat against their respective seats when closed, substantially as described and for the purpose specified.

HIRAM T. BUSH.

Witnesses:
CYRUS E. LOTHROP,
AMELIA J. WILLIAMS.